United States Patent [19]

Hyoki et al.

[11] Patent Number: 4,706,776
[45] Date of Patent: Nov. 17, 1987

[54] VEHICLE STEERING AND OPERATING APPARATUS

[75] Inventors: Takuzan Hyoki; Atsushi Uchida; Yuichi Yamamoto, all of Kashiwazaki, Japan

[73] Assignees: Kabushiki Kaisha Komatsu Seisakusho; Komatsu Zoki, Ltd., both of Tokyo, Japan

[21] Appl. No.: 825,286

[22] Filed: Feb. 3, 1986

[30] Foreign Application Priority Data

Feb. 6, 1985 [JP] Japan .................................. 60-19840

[51] Int. Cl.$^4$ ......................... B60K 26/00; B62D 1/16
[52] U.S. Cl. ..................................... 180/334; 74/493; 280/775
[58] Field of Search ............... 180/315, 326, 329, 330, 180/331, 334, 78; 280/775; 74/493

[56] References Cited

U.S. PATENT DOCUMENTS

| Re. 31,646 | 8/1984 | Beals et al. ............................ 180/78 |
| 3,799,569 | 3/1974 | Baker .................................. 280/775 |
| 4,291,896 | 9/1981 | Koch .................................. 180/334 |

FOREIGN PATENT DOCUMENTS

| 1949241 | 4/1971 | Fed. Rep. of Germany ........ 74/493 |
| 52-44924 | 8/1977 | Japan .................................. 74/493 |
| 58-39528 | 3/1983 | Japan .................................. 180/334 |
| 958720 | 5/1964 | United Kingdom ................ 280/775 |

Primary Examiner—David M. Mitchell
Assistant Examiner—Kenneth R. Rice
Attorney, Agent, or Firm—Armstrong, Nikaido, Marmelstein & Kubovcik

[57] ABSTRACT

A steering and operating apparatus used mainly for motor graders and which enables positions and attitudes of a steering wheel and operating levers to be varied in the longitudinal and vertical directions of the vehicle. The apparatus has a steering wheel mounted box and support frames for the operating levers. Both the steering wheel mounted box and the support frames are respectively tilted in the longitudinal direction of the vehicle by the actions of mechanical arrangements which are different from each other and operated independently of each other. Thus, both the steering wheel mounted box and the support frames for operating levers can be tilted independently of each other.

4 Claims, 7 Drawing Figures

VEHICLE STEERING AND OPERATING APPARATUS

BACKGROUND OF THE INVENTION

1. Field of the Invention

This invention relates to a vehicle steering and operating apparatus used mainly for motor graders and which enables positions and attitudes of a steering wheel and operating levers thereof to be varied in the longitudinal and vertical directions of the vehicle.

2. Description of the Prior Art

In driving a motor grader, its operator assumes both standing and seated postures depending on the nature of the work to be carried out. At that time, it is desirable for the operator to move the steering wheel and the operating levers in the longitudinal and vertical directions in accordance with his postures.

The above-mentioned conventional vehicle steering and operating apparatus is arranged such that, as can be seen from FIG. 7, a main column "b" having a steering wheel "a" attached to the uppermost part thereof is mounted on a floor plate "c" in such a manner that it can be tilted relative to the floor plate in the longitudinal direction of the vehicle, and a plurality of operating levers "d" are carried by the main column "b" and arranged such that they can be tilted together with the main column "b" in the longitudinal direction of the vehicle.

Besides the above-mentioned prior art example, there is another vehicle steering and operating apparatus disclosed in the Japanese Patent Publication No. 57-41082.

The vehicle steering and operating apparatus shown in this publicly known embodiment is arranged such that both the steering wheel and the operating levers group can be moved in substantially parallel relationship with their original positions at the same attitude, while the main column can be tilted in the longitudinal direction of the vehicle.

The above-mentioned former prior art former embodiment has been disadvantageous in that, when the main column "b" is tilted backwards as shown by phantom lines in FIG. 7, the steering wheel "a" and the operating levers "d" are tilted backwards at the same attitude as the main column "b" so that their attitudes are set indiscriminately by the angle of inclination of the main column "b" thus making it impossible for the operator to adjust their attitudes in accordance with the body build of the operator and the nature of the work to be carried out.

Further, the above-mentioned prior art letter embodiment has been disadvantageous in that, while the steering wheel and the operating levers can be held at the same attitude regardless of the inclination angle of the main column, the attitudes of the steering wheel and the operating levers cannot be changed independently from each other in accordance with their heights from the floor plate and their positions in the longitudinal direction of the vehicle, thus making it impossible to adjust their attitudes according to the body build of the operator and the work to be conducted as in the case of the prior art former embodiment.

SUMMARY OF THE INVENTION

The present invention has been made in view of the above-mentioned circumstances, and has for its object to provide a vehicle steering and operating apparatus characterized in that it comprises a steering wheel mounted box equipped with a steering wheel and instruments; support frames supporting operating levers groups on the left and right the of said steering wheel mounted box, said support frames being mounted on a floor plate so that they can be turned freely and independently from the steering wheel in the longitudinal direction of the vehicle; an engaging means mounted between the steering wheel mounted box and the floor plate and adapted to be engaged and disengaged by means of a first pedal; and a separate engaging means mounted between the support frames supporting the operating levers groups and the floor plate and adapted to be engaged and disengaged by means of a second pedal, the arrangement being made such that said steering wheel mounted box and the support frames supporting the operating levers groups can be independently turned in the longitudinal direction of the vehicle by means of the first and second pedals, respectively.

The above and many other advantages, features and additional objects of the present invention will become apparent to those skilled in the art upon making reference to the following detailed description and accompanying drawings in which a preferred structural embodiment incorporating the principles of the present invention are shown by way of illustrative example.

BRIEF DESCRIPTION OF THE DRAWINGS

FIGS. 1 to 6 illustrate one embodiment of the present invention; in which

FIG. 1 is an overall perspective view of the vehicle steering and operating apparatus of the present invention;

FIG. 2 is a partially cut-away side elevational view showing the engaging means of a steering wheel mounted box;

FIG. 3 is a partially cut-away front view looking from the opposite side of driver's seat;

FIG. 4 is a sectional view taken along line IV—IV in FIG. 3;

FIG. 5 is a sectional view taken along arrow V in FIG. 3; and

FIG. 6 is a sectional view taken along line VI—VI in FIG. 4.

DETAILED EXAMPLE OF THE INVENTION

Figure 1:
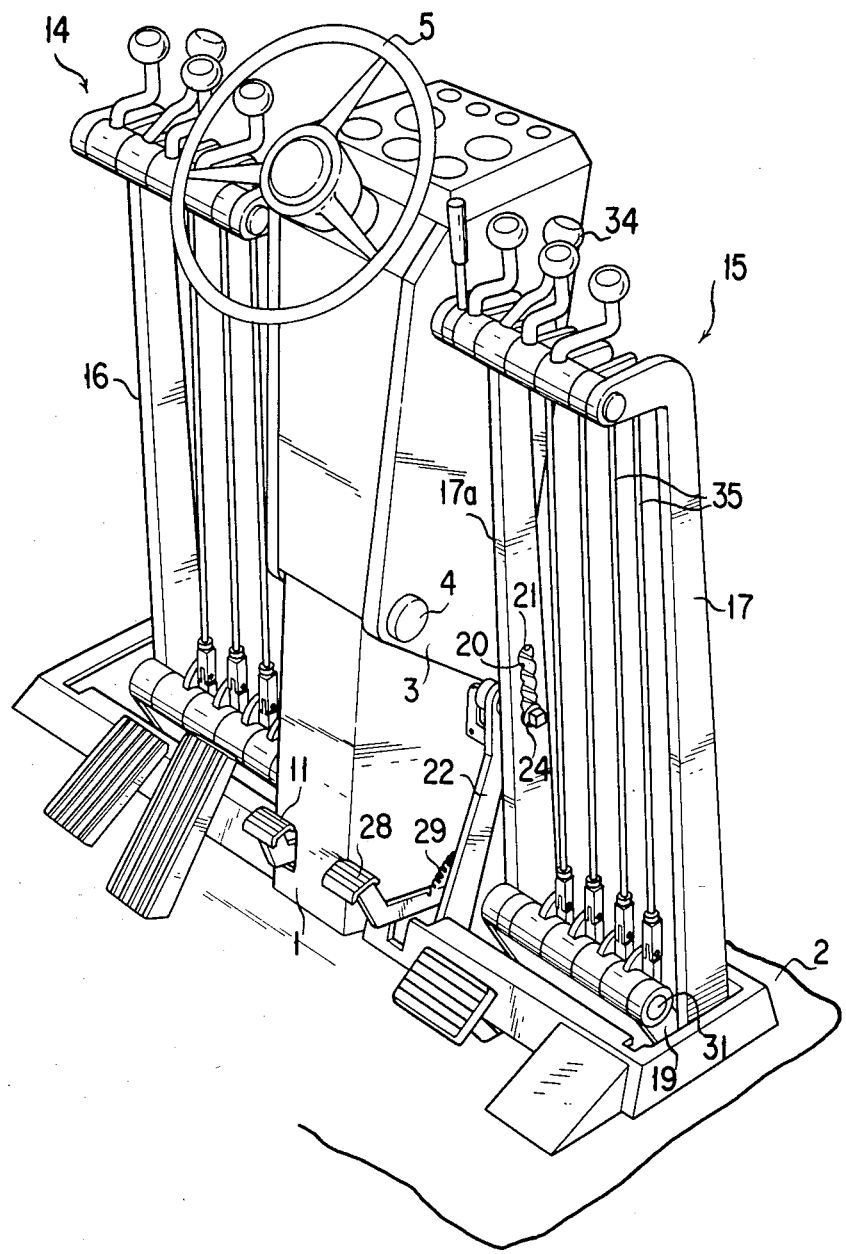
Figure 2:
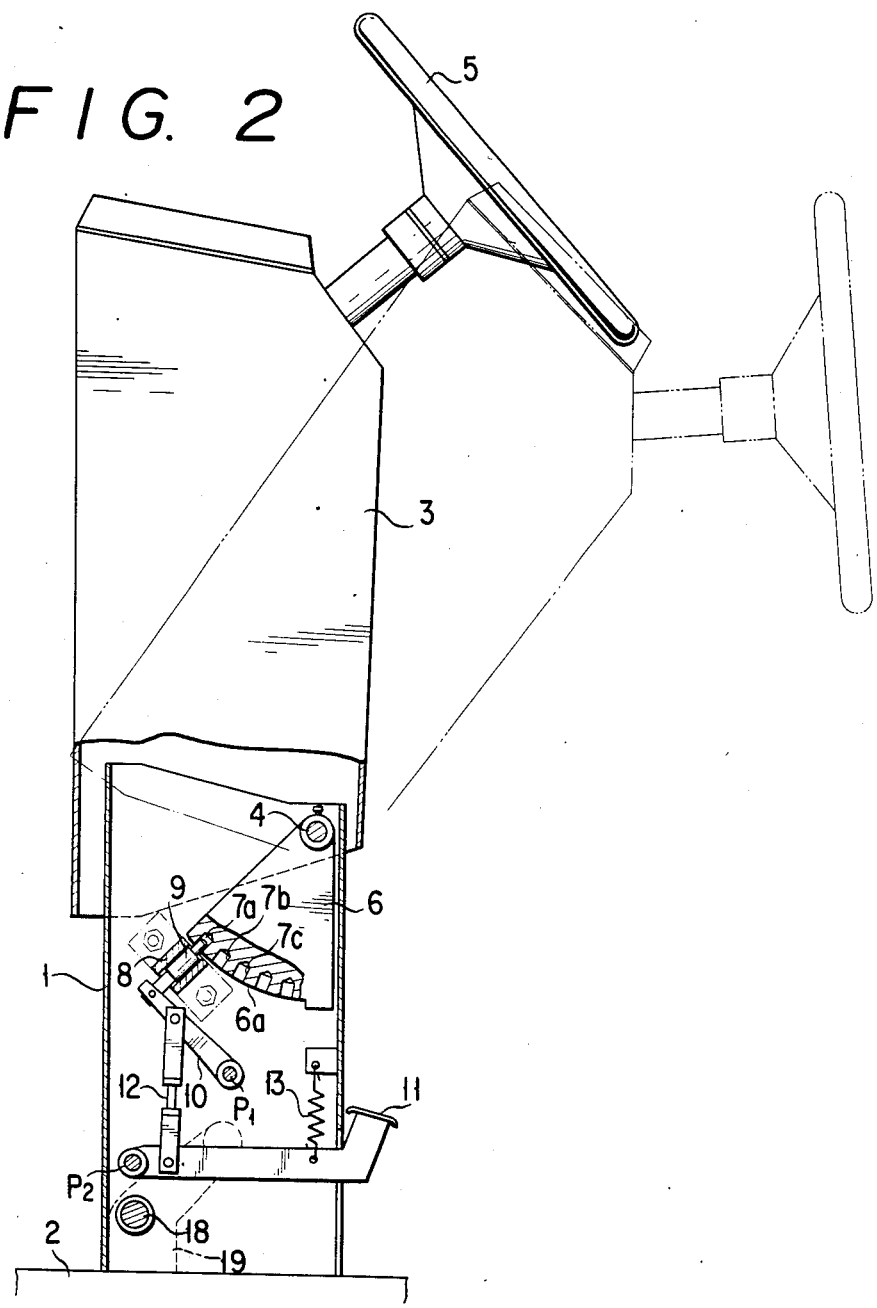
Figure 3:
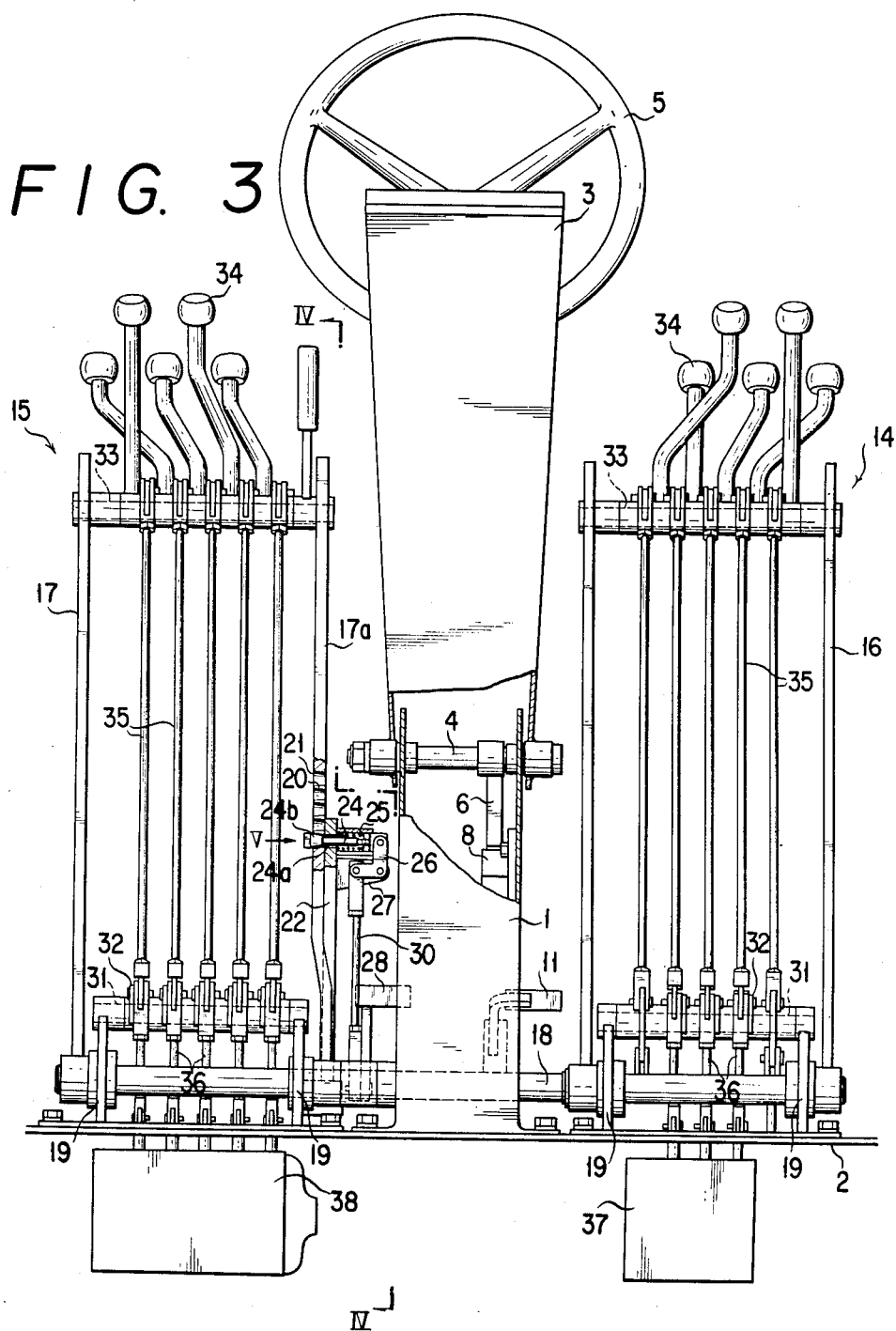
Figure 4:
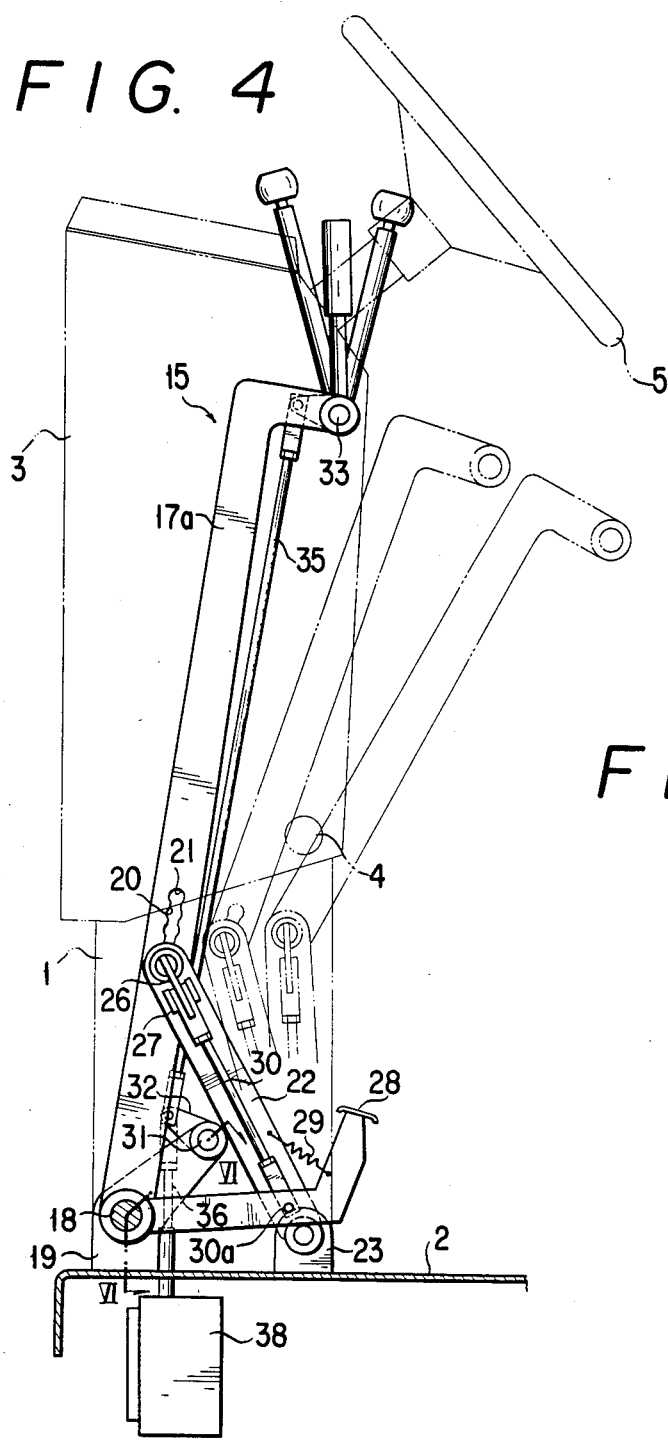
Figure 5:
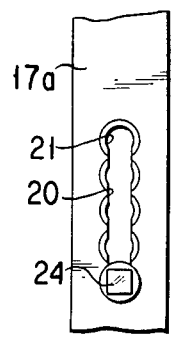
Figure 6:
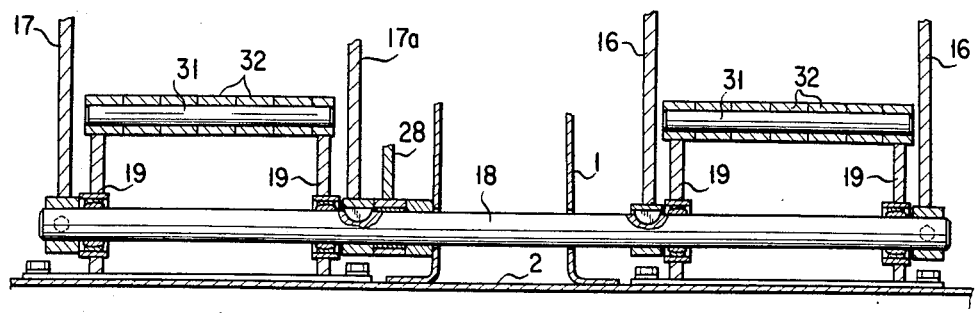
Figure 7:
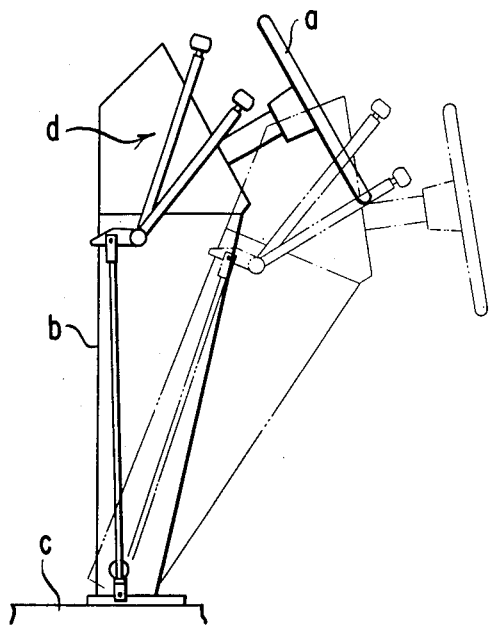
FIG. 7 is a side elevational view showing a prior art vehicle steering and operating apparatus.

The present invention will now be described in detail below by way of example with reference to FIGS. 1 to 6.

Reference numeral 1 denotes a frame base fixedly secured to a floor plate 2 in a driver's cab and located in the front of a driver's seat not shown. This frame base 1 is of an open-top box configuration in cross section. Reference numeral 3 denotes a steering wheel mounted box in which the upper part of the above-mentioned frame base 1. This steering wheel mounted box 3 is fixedly secured to a transversely extending shaft 4 which is rotatably mounted in the upper part of the frame base 1. Further, mounted in the upper part of the steering wheel mounted box 3 are a steering wheel 5 and various kinds of instruments facing the driver's seat. Connection members for the steering wheel 5 and the instruments, though not shown, pass through the inside of the steering wheel mounted box 3 and the frame base 1, and extends to the underside of the floor plate 2.

Fixedly secured to one side of the above-mentioned rotatable shaft 4 is a sector-shaped member 6 whose circular-arc face 6a faces downwards and which is located in the frame base 1 and the steering wheel mounted box 3. This sector-shaped member 6 has a plurality of engaging holes 7a, 7b, 7c, ---, formed radially in the circular-arc face 6a thereof and spaced apart from one another at the same distance. Reference numeral 8 denotes a support member fixedly secured to the frame base 1 adjacent and opposite to the circular-arc face 6a of the sector-shaped member 6. This support member 8 has a guide pin 9 slidably fitted therein and which is adapted to be detachably engaged with one of the holes 7a, 7b, 7c, ---, formed in the circular-arc face 6a. Reference numeral 10 indicates a turning lever whose tail end is pivotally connected through a pin $P_1$ to the frame base 1 and whose leading end is pivotally connected to the base end of the aforementioned pin 9. The arrangement is made such that turning of the turning lever 10 enables the pin 9 to be engaged with or disengaged from any of the holes 7a, 7b, 7c, ---.

Reference numeral 11 denotes a first pedal mounted in the lower part of the frame base 1, the base end of which pedal is pivotally connected through a pin $P_2$ to the frame base 1 and the leading end of which projects towards the driver's seat. The above-mentioned turning lever 10 is connected through a connecting rod 12 to the first pedal 11. Further, the first pedal 11 is biased by means of a spring 13 tending to turn it counterclockwise.

Reference numerals 14, 15 indicate the left and right operating levers groups located on both sides of the above-mentioned frame base 1, the operating levers groups 14 and 15 being supported by support frames 16 and 17, respectively. Reference numeral 18 denotes a rotatable shaft which passes through the frame base 1 and extends on both sides thereof, the left and right extensions of the shaft 18 being carried by means of a plurality of brackets 19 fixedly mounted on the floor plate 2. The aforementioned left and right support frames 16 and 17 are fixedly secured at their lower ends thereof to the rotatable shaft 18 by means of keys. The left and right supporting frames 16 and 17 are arranged such that they can be turned, as an integral unit, through a rotatable shaft 18, in the longitudinal direction of the vehicle. One of the left and right supporting frames 16 and 17, in particular, an inner frame member 17a of the supporting frame 17 located on the right side when looking frame the driver's seat has an elongated hole 20 formed at an intermediate part thereof and which extends longitudinally. This elongated hole 20 has a plurality of tapered holes 21 formed at predetermined space intervals in the longitudinal direction thereof so as to overlap the hole 20. Thus, the elongated hole 20 has recesses formed by the tapered holes 21 on both side walls thereof.

Reference numeral 22 indicates a support lever whose lower end is supported by a bracket 23, which is fixedly mounted on the floor plate 2 between the pivotally mounted point of the right support frame 17 and the driver's seat, in such a manner that the lever can be turned freely in front and in the rear. The side surface of the upper end of the support lever 22 is adjacent to that of the frame member 17a formed with the aforementioned elongated hole 20, and has a pin 24 slidably mounted in the upper end thereof and which is adapted to be fitted in the elongated hole 20. The leading end portion of the pin 24 has a guide portion 24a slidably fitted in the elongated hole 20 and an engaging portion 24b fitted in the tapered holes 21 overlapping the elongated hole 21, the portions 24a and 24b being spaced apart in the axial direction thereof. The engaging portion 24b is biased by means of a spring 25 so as to engage with any of the tapered holes 21.

Reference numeral 26 denotes a bell crank supported by a bracket 27 which is fixedly secured to one side surface of the support lever 22 in such a manner that it can be turned freely. One end of the bell crank 26 is connected to the base end of the aforementioned pin 24.

Reference numeral 28 denotes a second pedal supported rotatably by the rotatable shaft 18 supporting the operating levers groups 14 and 15 and which extends towards the driver's seat. Further, the second pedal 28 is located near the first pedal 11 and biased by means of a spring 29 in the counterclockwise direction. The second pedal 28 is connected through a pin 30a to one end of a rod 30 whose the other end is connected to the other end of the bell crank 26. When the second pedal 28 is depressed down, the pin 24 is moved through movements of the rod 30 and the bell crank 26 against the resilient force of the spring 25 to make its guide portion 24a slidable into the elongated hole 20 so as to tilt the operating levers groups 14 and 15.

The aforementioned left and right operating levers groups 14 and 15 are of substantially same configuration. Each of the operating levers groups 14 and 15 comprises a plurality of levers 32 pivotally mounted on a first support shaft 31 supported by the brackets 19 supporting the rotatable shaft 18, and also operating levers 34 mounted on a second support shaft 32 which extends transversely across the upper part of each of the support frames 16 and 17. Further, the operating levers 34 in the operating levers groups 14 and 15 are connected through rods 35 and 36 and levers 32 to control valves 37 and 38, respectively.

In the above-mentioned arrangement, when the first pedal 11 is depressed against the biasing force of the spring 13, the pin 9 engaged with any one of the holes 7a, 7b, 7c, --- formed in the sector-shaped member 6 connected as an integral part of the steering wheel mounted box 3 will be disengaged therefrom so as to enable the box 3 to be tilted freely relative to the frame base 1 in the longitudinal direction of the vehicle.

Thus, it becomes possible for the operator, under this condition, to hold the steering wheel 5 and turn the steering wheel mounted box 3, and then release the first pedal 11 when the box 3 has been turned over a predetermined angle so as to allow the pin 9 to be engaged with a predetermined one of the holes 7a, 7b, 7c, ---, to thereby enable the attitude of the box 3 to be independently set as desired in the longitudinal direction of the vehicle.

While, when the second pedal 28 is depressed, the engaging portion 24b of the pin 24 attached to the support lever 22 is disengaged from the tapered hole 21 formed in the frame member 17a of each of the operating levers groups 14 and 15 so as to disconnect the frame member 17a from the support lever 22 so that the left and right operating levers groups 14 and 15 can be turned freely relative to the brackets 19 in the longitudinal direction of the vehicle.

Thus, it becomes possible for the operator, under this condition, to hold the support frames 16 and 17 and turn them in the longitudinal direction of the vehicle, and then release the second pedal 28 when the support frames 16 and 17 have been turned over a predetermined angle to allow the engaging portion 24b of the pin 24 to be engaged with a predetermined one of the tapered holes 21 to thereby enable the attitude of the operating levers groups 14 and 15 to be set, as desired, independently from the steering wheel, in the longitudinal direction of the vehicle.

As described hereinable, according to the present invention, the arrangement is made such that the attitudes of the steering wheel mounted box 3 and the left and right operating levers groups 14 and 15 can be independently varied in the longitudinal direction of the vehicle, and regardless of whether the operator assumes standing posture or seating posture, it is possible for him to adjust the positions of the box 3 and the operating levers groups 14 and 15 in accordance with his body build and the work to be carried out.

It is to be understood that the foregoing description is merely illustrative of a preferred embodiment of the present invention, and that the invention is not to be limited thereto, but is to be determined by the scope of the appended claims.

What is claimed is:

1. A vehicle steering and operating apparatus comprising:
    (a) a steering wheel mounted box equipped with a steering wheel and instruments;
    (b) support frames supporting operating levers groups on left and right sides of said steering wheel mounted box, said support frames being mounted on a floor plate so that they can be tilted freely and independently from the steering wheel mounted box in the longitudinal direction of the vehicle;
    (c) a first engaging means mounted between said steering wheel mounted box and said floor plate to be engaged and disengaged by means of a first pedal for setting a plurality of attitudes of said steering wheel; and
    (d) a second engaging means mounted between said support frames supporting said operating levers groups and said floor plate, said second engaging means to be engaged and disengaged by means of a second pedal for setting a pluraltiy of attitudes of said operating levers groups independently from said steering wheel.

2. A vehicle steering and operating apparatus as claimed in claim 1 herein said steering wheel mounted box is allowed to tilt in the longitudinal direction of the vehicle by a mechanical arrangement comprising a transversely extending shaft rotatably mounted in an upper part of a frame base for supporting said steering wheel mounted box; a sector-shaped member rotatably mounted on said shaft and located in said frame base and said steering wheel mounted box, said sector-shaped member having a circular-arc face with which a plurality of engaging holes are provided, said engaging holes are formed radially in said circular-arc face and spaced apart from one another at the same distance; a first pedal, a base end of which pedal being pivotally connected through a pin to said frame base and a substantially middle portion of which pedal being connected through a spring to an inner wall of said frame base; a turning lever whose tail end is pivotally connected through a second pin to said frame base and whose intermediate portion is pivotally connected through a connecting rod to said first pedal; and a guide pin slidably fitted in a support member fixedly secured to said frame base, a leading end of which guide pin being slidably engageable with one of said engaging holes and a proximal end of which guide pin being pivotally connected to a leading end of said turning lever, wherein when said first pedal is depressed against the biasing force of said spring, said guide pin is disengaged from any one of said guide holes so as to enable said steering wheel mounted box to be tilted freely relative to said frame base in the longitudinal direction of the vehicle.

3. A vehicle steering and operating apparatus as claimed in claim 1 wherein said operating levers groups are allowed to tilt in the longitudinal direction of the vehicle by a mechanical arrangement comprising a support lever, a proximal end of which being pivotally connected through a bracket to said floor plate; a pin mounted to a leading end of said support lever and slidably fitted in an elongated hole formed longitudinally at an intermediate side portion of each of said support frames, said elongated hole being further formed longitudinally with a plurality of tapered holes; said second pedal, a proximal end of which being pivotally connected through one of brackets to a rotatable shaft and a portion near a leading end thereof being connected to a spring connected to said support lever; and a rod extending parallel to said support level; and a rod extending parallel to said support lever, a proximal end of which being connected through a second pin to a substantially middle portion of said second pedal and a leading end thereof being connected through a bell crank to said pin, wherein when said second pedal is depressed down, said pin is moved through movements of said rod and said bell crank to make the same slidable into said elongated hole so as to tilt said operating levers groups.

4. A vehicle steering and operating apparatus as claimed in claim 3 wherein a mechanical arrangement for tilting the operating levers groups is operated independently of the mechanical arrangement for tilting the steering wheel mounted box.

* * * * *